United States Patent
Hochi et al.

(10) Patent No.: US 10,008,722 B2
(45) Date of Patent: Jun. 26, 2018

(54) SULFUR-BASED POSITIVE-ELECTRODE ACTIVE MATERIAL AND LITHIUM-ION SECONDARY BATTERY

(71) Applicants: SUMITOMO RUBBER INDUSTRIES, LTD., Kobe-shi, Hyogo (JP); NATIONAL INSTITUTE OF ADVANCED INDUSTRIAL SCIENCE AND TECHNOLOGY, Tokyo (JP)

(72) Inventors: Kazuo Hochi, Kobe (JP); Tatsuya Kubo, Kobe (JP); Tetsuo Sakai, Ikeda (JP); Toshikatsu Kojima, Ikeda (JP)

(73) Assignees: SUMITOMO RUBBER INDUSTRIES, LTD., Kobe-Shi, Hyogo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days. days.

(21) Appl. No.: 15/022,282

(22) PCT Filed: Sep. 29, 2014

(86) PCT No.: PCT/JP2014/075919
§ 371 (c)(1),
(2) Date: Mar. 16, 2016

(87) PCT Pub. No.: WO2015/050086
PCT Pub. Date: Apr. 9, 2015

(65) Prior Publication Data
US 2016/0293955 A1  Oct. 6, 2016

(30) Foreign Application Priority Data

Oct. 4, 2013 (JP) .................................. 2013-209173
Mar. 26, 2014 (JP) .................................. 2014-063581

(51) Int. Cl.
*H01M 4/583* (2010.01)
*H01M 10/0525* (2010.01)
(Continued)

(52) U.S. Cl.
CPC ......... *H01M 4/583* (2013.01); *H01M 4/0471* (2013.01); *H01M 4/133* (2013.01);
(Continued)

(58) Field of Classification Search
CPC .... H01M 4/583; H01M 4/0471; H01M 4/133; H01M 4/136; H01M 4/364; H01M 4/38;
(Continued)

(56) References Cited

U.S. PATENT DOCUMENTS

2001/0033971 A1  10/2001  Zhao et al.
2006/0216516 A1   9/2006  Handa et al.
(Continued)

FOREIGN PATENT DOCUMENTS

CN  1922256 A   2/2007
CN  101962452 A  2/2011
(Continued)

OTHER PUBLICATIONS

International Search Report, issued in PCT/JP2014/075919, PCT/ISA/210, dated Dec. 2, 2014.
(Continued)

*Primary Examiner* — Harold Pyon
*Assistant Examiner* — Danny N Kang
(74) *Attorney, Agent, or Firm* — Birch, Stewart, Kolasch & Birch, LLP

(57) ABSTRACT

An object of the present invention is to provide a positive-electrode active material comprising a carbon-sulfur structure which has Raman shift peaks at around 500 cm$^{-1}$, at around 1,250 cm$^{-1}$ and at around 1,450 cm$^{-1}$ in a Raman spectrum, and by using the positive-electrode active mate-
(Continued)

rial, it is possible to greatly improve cycling characteristics of a lithium-ion secondary battery.

15 Claims, 2 Drawing Sheets

(51) Int. Cl.
| | |
|---|---|
| H01M 4/38 | (2006.01) |
| H01M 4/136 | (2010.01) |
| H01M 4/36 | (2006.01) |
| H01M 4/587 | (2010.01) |
| H01M 4/62 | (2006.01) |
| H01M 4/04 | (2006.01) |
| H01M 4/133 | (2010.01) |
| H01M 4/02 | (2006.01) |

(52) U.S. Cl.
CPC ............ *H01M 4/136* (2013.01); *H01M 4/364* (2013.01); *H01M 4/38* (2013.01); *H01M 4/587* (2013.01); *H01M 4/625* (2013.01); *H01M 10/0525* (2013.01); *H01M 2004/028* (2013.01)

(58) Field of Classification Search
CPC .. H01M 4/587; H01M 4/625; H01M 10/0525; H01M 2004/028; Y02E 60/122
USPC ........................................................ 252/500
See application file for complete search history.

(56) References Cited

U.S. PATENT DOCUMENTS

| | | | | |
|---|---|---|---|---|
| 2006/0216517 | A1* | 9/2006 | Handa | B29C 70/12 428/408 |
| 2009/0280593 | A1 | 11/2009 | Serban et al. | |
| 2011/0207872 | A1* | 8/2011 | Schinkel | B60C 1/00 524/495 |
| 2013/0122358 | A1* | 5/2013 | Maeda | H01M 2/0413 429/185 |

FOREIGN PATENT DOCUMENTS

| | | |
|---|---|---|
| CN | 102382329 A | 3/2012 |
| JP | 2002-154815 A | 5/2002 |
| JP | 2010-73730 A | 4/2010 |
| JP | 2011-28948 A | 2/2011 |
| JP | 2011028948 * | 2/2011 |
| JP | 2011028948 A * | 2/2011 |
| JP | 2012-28117 A | 2/2012 |
| JP | 2012-150933 A | 8/2012 |
| JP | 2012-221885 A | 11/2012 |
| JP | 2013-161653 A | 8/2013 |

OTHER PUBLICATIONS

Osuna et al. "Combined Quantum Chemical Density Functional Theory and Spectroscopic Raman and UV-vis-NIR Study of Oligothienoacenes with Five and Seven Rings", J. Phys. Chem. A, 2006, 110, pp. 5058-5065.

Written Opinion of the International Searching Authority, issued in PCT/JP2014/075919, PCT/ISA/237, dated Dec. 2, 2014.

International Preliminary Report on Patentability and English translation of the Written Opinion of the International Searching Authority (Forms PCT/IB/338, PCT/IB/373 and PCT/ISA/237), dated Apr. 14, 2016, for International Application No. PCT/JP2014/075919.

Extended European Search Report for European Application No. 14850931.8, dated Apr. 18, 2017

Nieuwenhuizen et al., "Thiuram- and Dithiocarbamate-Accelerated Sulfur Vulcanization from the Chemist's Perspective; Methods, Materials and Mechanisms Reviewed," Rubber Chemistry and Technology, vol. 70, No. 3, Jul. 1, 1997, pp. 368-429.

Office Action issued in Chinese Patent Application No. 201480051745.9 dated May 4, 2017.

* cited by examiner

SULFUR-BASED POSITIVE-ELECTRODE ACTIVE MATERIAL AND LITHIUM-ION SECONDARY BATTERY

TECHNICAL FIELD

The present invention relates to a new sulfur-based positive-electrode active material which can be used as a positive-electrode active material of a lithium-ion secondary battery, and a lithium-ion secondary battery using this sulfur-based positive-electrode active material.

BACKGROUND ART

Since a lithium-ion secondary battery, one type of non-aqueous electrolyte secondary batteries, is a light battery whose charging and discharging capacity is large, it has been used mainly as a battery for portable electronic devices. Moreover, lithium-ion secondary batteries have also been expected to be put into use as a battery for electrically-driven vehicles such as electric automobiles. Generally, materials compounding a rare metal such as cobalt or nickel are used as a positive-electrode active material of a lithium-ion secondary battery. However, due to the fact that rare metals are small in the distributed amount, not always easily available and additionally expensive, a positive-electrode active material using a material that replaces a rare metal has been required.

A technique of using elemental sulfur as a positive-electrode active material is known. That is, in the case where elemental sulfur is used as a positive-electrode active material, this sulfur is easily available compared to rare metals and is inexpensive, and has a further advantage that a charging and discharging capacity of a lithium-ion secondary battery can be made larger than the present state. For example, it is known that a lithium-ion secondary battery using sulfur as a positive-electrode active material can achieve about 6 times larger charging and discharging capacity than a lithium-ion secondary battery using lithium cobalt oxide which is a general positive-electrode material.

However, the lithium-ion secondary battery using elemental sulfur as the positive-electrode active material has a problem that a charging and discharging capacity is deteriorated through repeated charging and discharging. That is, elemental sulfur likely generates a compound with lithium when discharging and since the generated compound is soluble into an nonaqueous electrolyte (for example, ethylene carbonate and dimethyl carbonate and the like) of the lithium-ion secondary battery, the charging and discharging capacity is gradually reduced through repeated charging and discharging due to the sulfur eluting into the electrolyte.

Hereinafter, a property of preventing a reduction of a charging and discharging capacity associated with repeated charging and discharging is referred to as "cyclability". It is recognized while a lithium-ion secondary battery in which a degree of reduction of a charging and discharging capacity is large and a capacity retention rate is low is inferior in cyclability, a lithium-ion secondary battery in which a degree of reduction of a charging and discharging capacity is small and a capacity retention rate is high is excellent in cyclability. In order to improve cyclability by preventing sulfur from eluting into an electrolyte, a positive-electrode active material (hereinafter also referred to as "a sulfur-based positive-electrode active material") comprising sulfur and a material other than sulfur such as a carbon material has been proposed.

For example, Patent Document 1 discloses a technique of using a carbon polysulfide in which sulfur is bound to a carbon skeleton as a sulfur-based positive-electrode active material. A carbon polysulfide is a substance in which sulfur is added to a straight-chain unsaturated polymer, and synthesized, for example, by so-called vulcanization reaction, heat-treating polyisoprene and sulfur. By use of a sulfur-based positive-electrode active material comprising this carbon polysulfide, cyclability of a lithium-ion secondary battery can be improved to a certain degree compared to the case where elemental sulfur is used.

However, this effect is restrictive and cyclability of a lithium-ion secondary battery could not have been improved enough. It is considered that this is because sulfur and lithium are bonded at discharging, and that CS—SC bonds or S—S—S bonds in a carbon polysulfide are disconnected and then a polymer is cut.

Therefore, in order to improve cyclability, it has been considered to add polyacrylonitrile to polyisoprene (see Patent Documents 1 and 2 and the like). However, from what the inventors have studied, even if polyacrylonitrile is added, the effect obtained therefrom is restrictive and cyclability of a lithium-ion secondary battery still could not have been improved enough.

In Patent Document 3, it is described that an elution of sulfur is prevented by fixing sulfur by use of a carbon source compound comprising a polycyclic aromatic hydrocarbon in which three or more six-membered rings are fused. However, the effect obtained therefrom is also restrictive and further improvement is desired.

PRIOR ART DOCUMENT(S)

Patent Documents

Patent Document 1: JP 2002-154815 A
Patent Document 2: JP 2012-150933 A
Patent Document 3: JP 2013-161653 A

SUMMARY OF THE INVENTION

Problem to be Solved by the Invention

An object of the present invention is to provide a new sulfur-based positive-electrode active material which can largely improve cyclability of a lithium-ion secondary battery, and a lithium-ion secondary battery using the sulfur-based positive-electrode active material.

Means to Solve the Problem

The present invention is a positive-electrode active material comprising a carbon-sulfur structure which has Raman shift peaks at around 500 cm$^{-1}$, at around 1,250 cm$^{-1}$ and at around 1,450 cm$^{-1}$ in a Raman spectrum. The carbon-sulfur structure is assumed to have a long-chain polymer thienoacene structure in which thiophene rings are fused and linked, as represented by the formula (i):

[Chemical formula 1]

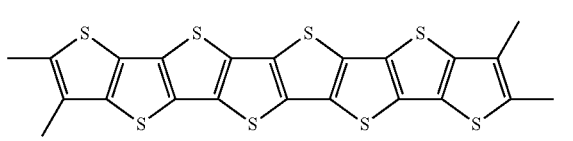

(i)

That is, it is considered that a Raman shift peak at around 500 cm$^{-1}$ is due to an in-plane bending of thiophene, a Raman shift peak at around 1,250 cm$^{-1}$ is due to an in-plane bending of C—C in a thienyl ring, and a Raman shift peak at around 1,450 cm$^{-1}$ is due to a stretching of C=C in thiophene.

A technique of preventing a reduction, due to an elution of sulfur, of a charging and discharging capacity by fixing sulfur with a long-chain polymer carbon-sulfur structure having the above thienoacene structure has never been reported before and is a new attempt. Further, since thienoacene has conjugate structure that contributes to electron conductivity in its molecule, the above carbon-sulfur structure can be suitably used as a material for forming a positive-electrode active material.

Moreover, a polymer of the carbon-sulfur structure is not a simple straight-chain but constitutes a three dimensional network and further has a function of enclosing and fixing elemental sulfur in such network. Therefore, in addition to the fact that the above carbon-sulfur structure itself is composed by incorporating a large amount of sulfur in its molecule, a charging and discharging capacity of a lithium-ion secondary battery can be made sufficiently large, and an elution of both sulfur in the above molecule and elemental sulfur enclosed in the network is prevented more securely than before to enable a large improvement of cyclability of a lithium-ion secondary battery The present invention is a sulfur-based positive-electrode active material obtained by
compounding in an unvulcanized diene rubber:
sulfur and at least one of
(1) 1 to 60 parts by mass of a vulcanization accelerator based on 100 parts by mass of the diene rubber and
(2) 2 to 60 parts by mass of an electrically-conductive powder based on 100 parts by mass of the diene rubber, and
heat-treating the compounded mixture.

In addition to the fact of being widely used, easily available and inexpensive, a diene rubber has high reactivity with sulfur and a high double bond content for incorporating sulfur. Therefore, by heat-treating an unvulcanized diene rubber and sulfur at a temperature higher than that used in a normal vulcanization, a carbon-sulfur structure having the above-explained long-chain polymer thienoacene structure is generated and a large amount of sulfur can be incorporated in a molecule. At the same time, the generated carbon-sulfur structure constitutes a three-dimensional network as explained above, and can enclose and fix elemental sulfur.

A vulcanization accelerator accelerates the above reaction and allows a diene rubber to incorporate a further large amount of sulfur and additionally, a vulcanization accelerator is considered to function to improve cyclability of a lithium-ion secondary battery by preventing cutting of a polymer at discharging. On the other hand, an electrically-conductive powder is considered to function to improve cyclability of a lithium-ion secondary battery by increasing reactivity with a lithium-ion by improving electrical conductivity inside a sulfur-based positive-electrode active material.

It is noted that in order to obtain the above effect, in the case of (1), a compounding ratio of a vulcanization accelerator needs to be 1 to 60 parts by mass based on 100 parts by mass of a diene rubber. If the compounding ratio of a vulcanization accelerator is less than the above range, an effect of improving cyclability of a lithium-ion secondary battery in accordance with the above mechanism by compounding the vulcanization accelerator cannot be obtained.

On the other hand, if the compounding ratio of a vulcanization accelerator exceeds the above range, an effect of improving cyclability of a lithium-ion secondary battery cannot be obtained conversely. It is considered that this is because components having a small molecular weight which is easily dissolved or eluted are apt to be generated by an excess vulcanization accelerator disarranging a polymer structure of the carbon-sulfur structure formed by a reaction of a diene rubber and sulfur. On the other hand, the compounding ratio of a vulcanization accelerator within the above range can successfully cause the above effect obtained by compounding the vulcanization accelerator, and can largely improve cyclability of a lithium-ion secondary battery.

In the case of (2), a compounding ratio of electrically-conductive powder needs to be 2 to 60 parts by mass based on 100 parts by mass of a diene rubber. If the compounding ratio is less than the above range, an effect of improving cyclability of a lithium-ion secondary battery in accordance with the above mechanism by compounding the electrically-conductive powder cannot be obtained.

On the other hand, if the compounding ratio of electrically-conductive powder exceeds the above range, an amount of structure containing sulfur becomes relatively small and thus a charging and discharging capacity of a lithium-ion secondary battery becomes small. On the other hand, the compounding ratio of electrically-conductive powder within the above range can successfully cause the above effect obtained by compounding the electrically-conductive powder while maintaining a sufficiently large charging and discharging capacity of a lithium-ion secondary battery, and can improve cyclability of a lithium-ion secondary battery.

The present invention is a lithium-ion secondary battery characterized by comprising the above sulfur-based positive-electrode active material of the present invention. The lithium-ion secondary battery of the present invention is excellent in a charging and discharging capacity and cyclability due to a function of the above sulfur-based positive-electrode active material.

Effect of the Invention

According to the present invention, it is possible to provide a new sulfur-based positive-electrode active material which can largely improve cylcability of a lithium-ion secondary battery, and a lithium-ion secondary battery using the sulfur-based positive-electrode active material.

DESCRIPTION OF EMBODIMENTS

<<Sulfur-based Positive-electrode Active Material>>
<Carbon-sulfur Structure>

The sulfur-based positive-electrode active material of the present invention is characterized by comprising a carbon-sulfur structure (see for example FIG. 2) which has Raman shift peaks at around 500 cm$^{-1}$, at around 1,250 cm$^{-1}$ and at around 1,450 cm$^{-1}$ in a Raman spectrum.

Figure 2:
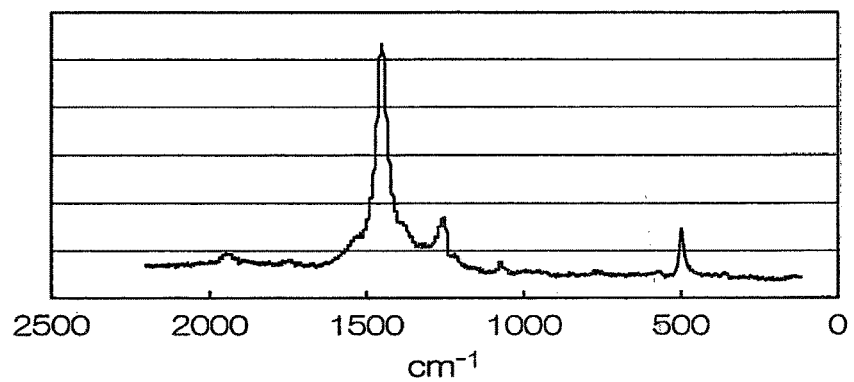
FIG. 2 is a graph showing a result of a Raman spectrum analysis of the sulfur-based positive-electrode active material of Example 1.

The spectrum of FIG. 2 is different from a spectrum referred to as D band at around 1350 cm$^{-1}$ and G band at around 1590 cm$^{-1}$ which are seen in graphite structure of six-membered rings, but is similar to a spectrum of thienoacene as described in a document [Chem. Phys. Chem 2009, 10, 3069-3076]. Thus the carbon-sulfur structure representing the above Raman spectrum is assumed to have a long-chain polymer thienoacene structure in which thiophene rings are fused and linked, as represented by the formula (i):

[Chemical formula 1]

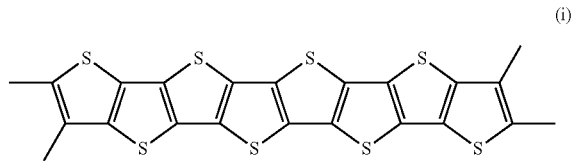

(i)

<Sulfur-based Positive-electrode Active Material>

The sulfur-based positive-electrode active material of the present invention is preferably composed by enclosing elemental sulfur with a network of the above carbon-sulfur structure as described above. It is also preferable that the sulfur-based positive-electrode active material of the present invention includes an electrically-conductive powder.

From these compositions, a charging and discharging capacity of a lithium-ion secondary battery can be further increased. The sulfur-based positive-electrode active material of the present invention can be obtained by compounding in an unvulcanized diene rubber:
sulfur and at least one of
(1) 1 to 60 parts by mass of a vulcanization accelerator based on 100 parts by mass of the diene rubber and
(2) 2 to 60 parts by mass of an electrically-conductive powder based on 100 parts by mass of the diene rubber, and
heat-treating the compounded mixture.

<Diene Rubber>

In addition to the fact of being widely used, easily available and inexpensive, a diene rubber has high reactivity with sulfur and a high double bond content for incorporating sulfur. Therefore, by heat-treating an unvulcanized diene rubber and sulfur at a temperature higher than that used in a normal vulcanization, a carbon-sulfur structure having the long-chain polymer thienoacene structure as represented by the above formula (i) is generated and a large amount of sulfur can be incorporated in a molecule. At the same time, the generated carbon-sulfur structure constitutes a three-dimensional network as explained above, and can enclose and fix elemental sulfur.

Examples of such diene rubber include a natural rubber, an isoprene rubber, a butadiene rubber and the like and one or more thereof may be suitably used. Among them, a natural rubber and a high-cis polybutadiene rubber are particularly preferable. Since the both rubbers are apt to have an irregular structure in which molecular chains wind, it is possible to hardly cause crystallization by making intermolecular forces between adjacent molecular chains relatively small, whereby flexibility and processability of a carbon-sulfur structure and further a sulfur-based positive-electrode active material can be improved.

It is particularly preferable to use a butadiene rubber such as a high-cis polybutadiene rubber to further homogenize a structure of a carbon-sulfur structure. The carbon-sulfur structure formed using such butadiene rubber is different from that derived from a natural rubber, and can be distinguished therefrom in that a Raman shift peak at around 1,940 cm$^{-1}$ exists and Raman shift peaks at around 1,400 cm$^{-1}$ and at around 1,550 cm$^{-1}$ are extremely small.

That is, while the carbon-sulfur structure derived from a natural rubber is basically composed of thienoacene structure but partly includes graphite structure and, therefore, a part of the structure is irregular, the carbon-sulfur structure derived from a butadiene rubber does not include such graphite structure and, therefore, the structure is homogenous and is particularly excellent in the above effect.

<Sulfur>

Sulfur in various forms such as powdery sulfur, precipitated sulfur, insoluble sulfur, colloidal sulfur and the like may be used. It is noted that from the viewpoint of uniform dispersion into a diene rubber, colloidal sulfur which is fine particles may be suitably used.

The compounding ratio of sulfur is preferably not less than 250 parts by mass, further preferably not less than 500 parts by mass, particularly preferably not less than 800 parts by mass, and on the other hand, preferably not more than 2,000 parts by mass, particularly preferably not more than 1,500 parts by mass, based on 100 parts of a diene rubber. If the compounding ratio of sulfur is less than this range, a charging and discharging capacity of a lithium-ion secondary battery or cyclability may not be improved sufficiently.

On the other hand, if the compounding ratio of sulfur exceeds the above range, a further effect cannot be obtained and additionally, excess sulfur becomes wasteful and may result in a cost increase of the sulfur-based positive-electrode active material.

<Vulcanization Accelerator>

Any of various vulcanization accelerators which function to improve cyclability of a lithium-ion secondary battery by the above explained mechanism can be used as a vulcanization accelerator.

Examples of such vulcanization accelerator include one or more of a thiourea vulcanization accelerator, a guanidine vulcanization accelerator, a thiazole vulcanization accelerator, a sulfenamide vulcanization accelerator, a thiuram vulcanization accelerator, a dithiocarbamate vulcanization accelerator, a xanthate vulcanization accelerator and the like. Examples of the thiuram compound include one or more of tetramethylthiuram disulfide (TT), tetraethylthiuram disulfide (TET), tetrabutylthiuram disulfide (TBT), tetrakis (2-ethylhexyl) thiuram-disulfide (TOT-N), tetramethylthiuram monosulfide (TS), dipentamethylenethiuram tetrasulfide (TRA) and the like.

Ones in which any of terminal substituent groups are a linear alkyl such as TT, TET, TBT and TS are preferable as a thiuram compound. As for a dithiocarbamate compound, a zinc salt thereof is preferable. Examples of a zinc salt of dithiocarbamate include one or more of zinc diethyldithiocarbamate (EZ), zinc dibutyldithiocarbamate (BZ), zinc dimethyldithiocarbamate (PZ), zinc N-ethyl-N-phenyldithiocarbamate (PX) and the like.

By selecting and using these compounds as a vulcanization accelerator, it is possible to form a sulfur-based positive-electrode active material which is excellent in an effect of improving not only cyclability but also a charging and discharging capacity of a lithium-ion secondary battery.

<Electrically-conductive Powder>

Any of various electrically-conductive powders which function to improve cyclability of a lithium-ion secondary battery by the above explained mechanism can be used as electrically-conductive powder. A carbon material having a graphite structure is particularly preferable as electrically-conductive powder.

Examples of such carbon material include one or more of carbon materials having a fused aromatic ring structure such as carbon black, graphite, carbon nanotube (CNT), carbon fiber (CF), graphene, fullerene and the like. Electrically-conductive powders having a heterocyclic structure such as a nitrogen-containing heterocyclic structure may be also used as an electrically-conductive powder.

Among them, carbon black is preferable since it is inexpensive and excellent in dispersibility. Also, a small amount of CNT or graphene may be combined with carbon black. In accordance with such combination, cyclability of a lithium-ion secondary battery can be further improved without largely increasing a cost. The combined amount of CNT or graphene is preferably 8 to 12% by mass based on the total amount of electrically-conductive powder.

<Compounding Ratio of Vulcanization Accelerator and Electrically-conductive Powder>

In the case of (1), the compounding ratio of the vulcanization accelerator needs to be, as explained above, 1 to 60 parts by mass based on 100 parts by mass of the diene rubber. If the compounding ratio of the vulcanization accelerator is less than this range, an effect of improving cyclability of a lithium-ion secondary battery by compounding the vulcanization accelerator in accordance with the above mechanism cannot be obtained.

On the other hand, if the compounding ratio of a vulcanization accelerator exceeds the above range, an effect of improving cyclability of a lithium-ion secondary battery cannot be obtained conversely. It is considered that this is because components having a small molecular weight which is easily dissolved or eluted are apt to be generated by an excess vulcanization accelerator disarranging a polymer structure of the carbon-sulfur structure formed by a reaction of a diene rubber and sulfur. On the other hand, the compounding ratio of a vulcanization accelerator within the above range can successfully cause the above effect obtained by compounding the vulcanization accelerator, and can largely improve cyclability of a lithium-ion secondary battery.

In view of further improvement of such effect and a charging and discharging capacity of a lithium-ion secondary battery, the compounding ratio of the vulcanization accelerator is, within the above range, preferably 10 to 30 parts by mass based on 100 parts by mass of the diene rubber. Cyclability of a lithium-ion secondary battery can be further improved when electrically-conductive powder is combined with the vulcanization accelerator in the above compounding ratio. In that case, the compounding ratio of the electrically-conductive powder is preferably 2 to 60 parts by mass based on 100 parts by mass of the diene rubber.

If the compounding ratio of electrically-conductive powder is less than this range, an effect of further improving cyclability of a lithium-ion secondary battery by combining electrically-conductive powder with the vulcanization accelerator may not be obtained sufficiently. On the other hand, if the compounding ratio of the electrically-conductive powder exceeds the above range, an amount of structure containing sulfur becomes relatively small and thus a charging and discharging capacity of a lithium-ion secondary battery may become small.

On the other hand, the compounding ratio of electrically-conductive powder within the above range can further improve cyclability of a lithium-ion secondary battery while maintaining a sufficiently large charging and discharging capacity of the lithium-ion secondary battery. Additionally, in view of further improvement of such effect, the compounding ratio of the electrically-conductive powder to be combined is preferably, within the above range, 10 to 40 parts by mass based on 100 parts by mass of the diene rubber.

In the case where (2) electrically-conductive powder is used alone, the compounding ratio thereof needs to be 2 to 60 parts by mass based on 100 parts by mass of the diene rubber. If the compounding ratio of the electrically-conductive powder is less than this range, an effect of improving cyclability of a lithium-ion secondary battery by compounding the electrically-conductive powder in accordance with the above-explained mechanism cannot be obtained.

On the other hand, if the compounding ratio of the electrically-conductive powder exceeds the above range, a structure containing sulfur becomes relatively small and thus a charging and discharging capacity of a lithium-ion secondary battery becomes small. On the other hand, the compounding ratio of electrically-conductive powder within the above range can successfully cause the above effect obtaiend by compounding the electrically-conductive powder while maintaining a sufficiently large charging and discharging capacity of a lithium-ion secondary battery, and can improve cyclability of a lithium-ion secondary battery.

Additionally, in view of further improvement of such effect, the compounding ratio of the electrically-conductive powder is preferably, within the above range, not less than 5 parts by mass, particularly preferably not less than 10 parts by mass and preferably not more than 40 parts by mass, particularly preferably not more than 30 parts by mass based on 100 parts by mass of the diene rubber. In the both cases of (1) and (2), if CNT or graphene which is excellent in electrical conductivity is used alone or combined with carbon black as electrically-conductive powder, the compounding ratio of electrically-conductive powder as a whole can be made as small as possible within the above-explained range, compared to the case where the carbon black is used alone.

<Production of Sulfur-based Positive-electrode Active Material>

By heat-treating a rubber composition comprising each of the above components in a given ratio at a temperature higher than that used in a normal vulcanization, a carbon-sulfur structure having the long-chain polymer thienoacene structure as represented by the above formula (i) is generated and a sulfur-based positive-electrode active material of the present invention is produced by enclosing and fixing elemental sulfur with the generated carbon-sulfur structure.

It is preferable to perform a heat treatment under a non-oxidizing atmosphere since an oxidative deterioration or an excess thermal decomposition of the components can be prevented and a sulfur-based positive-electrode active material which is excellent in an effect of improving a charging and discharging capacity or cyclability of a lithium-ion secondary battery can be formed. Specifically, a rubber composition may be heat-treated under an inert gas atmosphere such as nitrogen or argon. The temperature of the heat treatment is not limited particularly, but is preferably not lower than 300° C., particularly preferably not lower than 350° C. and is preferably not higher than 550° C., particularly preferably not higher than 450° C.

If the temperature is less than this range, the above reaction is insufficient and an enough amount of sulfur cannot be incorporated into the diene rubber and which may result in a decreased charging and discharging capacity or deteriorated cyclability of a lithium-ion secondary battery. On the other hand, if the temperature of the heat treatment exceeds the above range, a —C—C— bond in the diene rubber is easily decomposed and which may result in a decreased yield of the carbon-sulfur structure, further the sulfur-based positive-electrode active material, or a decreased charging and discharging capacity of a lithium-ion secondary battery.

On the other hand, the temperature of the heat treatment within the above range allows a production in high yield of a sulfur-based positive-electrode active material of a lithium-ion secondary battery which has a large charging and discharging capacity and excellent cyclability. The sulfur-based positive-electrode active material can also be produced by heat-treating the rubber composition while kneading the rubber composition in a continuous apparatus such as a twin-screw extruder.

In the produced sulfur-based positive-electrode active material, a so called unreacted sulfur, which is not incorporated into a molecular of the carbon-sulfur structure or is not enclosed in a network, may remain such as the case where sulfur sublimated at the heat treatment is cooled and deposited. Such unreacted sulfur needs to be removed since it causes deterioration of cyclability. Examples of a method for removing unreacted sulfur include a removal by heating under a reduced pressure, a removal by warm wind, a removal by washing with a solvent and the like. It is noted that elemental sulfur enclosed in a network of the carbon-sulfur structure is not removed when unreacted sulfur is removed.

The produced sulfur-based positive-electrode active material is pulverized so as to be predetermined grain sizes and is classified to be particles suitable for production of a positive electrode. It is noted that in the above-explained heat treatment method using a twin-screw extruder, the produced sulfur-based positive-electrode active material can also be pulverized at the same time due to shearing at kneading.

<Characteristics of Sulfur-based Positive-electrode Active Material>

The sulfur-based positive-electrode active material produced via the above heat treatment is mainly composed of the carbon-sulfur structure as represented by the above formula (i) and as the total content of sulfur which is incorporated into a molecular of the carbon-sulfur structure or enclosed in the network increases, cyclability of a lithium-ion secondary battery tends to be improved. Therefore, the total content of sulfur in the sulfur-based positive-electrode active material as large as possible is preferable. The total content of sulfur in accordance with an elemental analysis is preferably not less than 50% by mass. It is also preferable that the content of hydrogen is not more than 1.6% by mass, particularly not more than 1.0% by mass.

Any of the above conditions is important for a formation of a thienoacene structure and if these conditions are not satisfied, a length of a chain of the carbon-sulfur structure which constitutes the sulfur-based positive-electrode active material tends to be short. Therefore, the amount of sulfur incorporated into a molecular of the carbon-sulfur structure becomes small, or a network of enough size to enclose elemental sulfur cannot be formed, or electron conductivity of the carbon-sulfur structure is deteriorated. As a result, a charging and discharging capacity of a lithium-ion secondary battery may be decreased. In addition, an elution of sulfur into an electrolyte may not be sufficiently prevented and cyclability may be deteriorated.

On the other hand, by making the content of sulfur and/or hydrogen within the above range and forming a carbon-sulfur structure which has an enough chain length, cyclability of a lithium-ion secondary battery can be further improved while maintaining a sufficiently large charging and discharging capacity of the lithium-ion secondary battery. Moreover, it is preferable that the sulfur-based positive-electrode active material satisfies the following characteristics.

In an FT-IR spectrum, peaks exist at around 917 $cm^{-1}$, at around 1,042 $cm^{-1}$, at around 1,149 $cm^{-1}$, at around 1,214 $cm^{-1}$, at around 1,388 $cm^{-1}$, at around 1,415 $cm^{-1}$ and at around 1,439 $cm^{-1}$.

It is noted that in the case where a carbon material having a graphite structure is compounded as electrically-conductive powder, while carbon constituting the carbon material may lower the content of sulfur below the above range, an effect of improving cyclability of a lithium-ion secondary battery can still be brought out. However, in that case, the content of sulfur is preferably not less than 45% by mass for maintaining the effect of improving cyclability of a lithium-ion secondary battery.

<<Lithium-ion Secondary Battery>>

The lithium-ion secondary battery of the present invention is characterized by comprising the above sulfur-based positive-electrode active material of the present invention. Such lithium-ion secondary battery of the present invention has a large charging and discharging capacity and is excellent in cyclability, due to an inclusion of the sulfur-based positive-electrode active material of the present invention as a positive-electrode active material.

<Positive Electrode>

The positive electrode can be formed in the same manner as a conventional one except that the above sulfur-based positive-electrode active material is used as a positive-electrode active material. For example, a particulate sulfur-based positive-electrode active material of the present invention is mixed with an electrically-conductive additive, a binder and a solvent to prepare a paste-like positive-electrode active material and the positive-electrode active material is applied on a collector and dried to form a positive electrode.

Otherwise, it is also possible that the sulfur-based positive-electrode active material of the present invention is kneaded together with an electrically-conductive additive, a binder and a small amount of solvent using a mortar or the like, and the kneaded mixture is formed into a film shape and then pressed against a collector using a pressing machine or the like to form a positive electrode.

(Electrically-conductive Additive)

Examples of an electrically-conductive additive include one or more of vapor grown carbon fibers (Vapor Grown Carbon Fibers: VGCF), carbon powders, carbon black (CB), acetylene black (AB), KETJENBLACK (KB), graphite, fine powders of metals being stable at positive-electrode potentials, such as aluminum and titanium and the like.

(Binder)

Examples of a binder include one or more of polyvinylidene fluoride (PVDF), polytetrafluoroethylene (PTFE), styrene-butadiene rubber (SBR), polyimide (PI), polyamideimide (PAI), carboxymethyl cellulose (CMC), polyvinyl chloride (PVC), methacryl resins (PMA), polyacrylonitrile (PAN), modified polyphenylene oxide (PPO), polyethylene oxide (PEO), polyethylene (PE), polypropylene (PP) and the like.

(Solvent)

Examples of a solvent include one or more of N-methyl-2-pyrrolidone, N,N-dimethylformaldehyde, alcohols, water and the like.

(Compounding Ratio)

The compounding ratio of each of the above components is not limited particularly but for example, it is preferable to compound 20 to 100 parts by mass of an electrically-conductive additive, 10 to 20 parts by mass of a binder and an appropriate amount of a solvent based on 100 parts by mass of the sulfur-based positive-electrode active material.

(Collector)

As for a collector, those which have been used commonly as positive electrodes for a lithium-ion secondary battery may be used. Examples of a collector include aluminum foils, aluminum meshes, punched aluminum sheets, aluminum expanded sheets, stainless-steel foils, stainless-steel meshes, punched stainless-steel sheets, stainless-steel expanded sheets, foamed nickel, nickel nonwoven fabrics, copper foils, copper meshes, punched copper sheets, copper expanded sheets, titanium foils, titanium meshes, carbon nonwoven fabrics, carbon woven fabrics and the like.

Among these, a carbon nonwoven fabric collector and/or a carbon woven fabric collector, which is composed of carbon with high graphitization degree, is suitable for a collector for the sulfur-based positive-electrode active material because it does not include hydrogen and has low reactivity to sulfur. As for a raw material for carbon fiber with high graphitization degree, it is possible to use various types of pitches (namely, the byproducts of petroleum, coal, coal tar, and so on) that make a material for carbon fibers, or polyacrylonitrile fibers (PAN) and the like.

<Negative Electrode>

Examples of a negative electrode material which constitutes a negative electrode of a lithium-ion secondary battery with a positive electrode include known negative electrode materials such as metallic lithium, carbon-based materials such as graphite, silicon-based materials such as a silicon thin film, alloy-based materials such as copper-tin or cobalt-tin and the like. Particularly, in the case where a material that does not comprise lithium such as a carbon-based material, a silicon-based material, an alloy-based material and the like is used as a negative electrode material, the short-circuiting between positive and negative electrodes, which results from production of dendrite, is less likely to arise and the life time of a lithium-ion secondary battery can be prolonged.

A silicon-based material, which is a high capacity negative electrode material, is preferable. Among them, a silicon thin film that can make a thickness of the electrode thinner and is advantageous in capacity per volume is particularly preferable. However, in the case where a negative electrode material that does not comprise lithium is used in combination with the positive electrode of the present invention, neither the positive electrode nor the negative electrode includes lithium and thus a pre-doping treatment, in which lithium is inserted into either one of the negative electrode and positive electrode, or into both of them, becomes necessary.

For a method of pre-doping, a publicly known method can be used. For example, in the case where a negative electrode is doped with lithium, the following methods can be given: an electrolytically-doping method, in which a half-cell is assembled using metallic lithium as the counter electrode and then doping lithium electrochemically; and an application pre-doping method, in which doping is done by a diffusion of lithium onto an electrode by applying a metallic lithium foil onto the electrode and then leaving the electrode with the metallic lithium foil applied as it is within an electrolytic solution.

Moreover, in another case as well where the positive electrode is pre-doped with lithium, it is possible to utilize the aforementioned electrolytically-doping method.

<Electrolyte>

As for an electrolyte to be used in both the positive electrode and the negative electrode of the lithium secondary battery, it is possible to use those in which an alkali-metal salt serving as an electrolyte is dissolved in an organic solvent.

Examples of an organic solvent include at least one selected from nonaqueous solvents, such as ethylene carbonate, propylene carbonate, dimethyl carbonate, diethyl carbonate, ethyl methyl carbonate, dimethyl ether, γ-butyrolactone, acetonirile and the like. Examples of an electrolyte include $LiPF_6$, $LiBF_4$, $LiAsF_6$, $LiCF_3SO_3$, LiI, $LiClO_4$ and the like.

A concentration of the electrolyte can be from about 0.5 mol/liter to 1.7 mol/liter. It is noted that the electrolyte is not limited to a liquid form. For example, in the case where the lithium secondary battery is a lithium polymer secondary battery, the electrolyte is a solid form (for example, a form of polymer gel). In addition to the above-described negative electrode, positive electrode and electrolyte, the lithium secondary battery can be further equipped with the other members, such as separators, as well.

A separator intervenes between the positive electrode and the negative electrode, thereby not only allowing the movements of ions between the positive electrode and the negative electrode but also functioning to prevent the positive electrode and the negative electrode from internally short-circuiting one another. When the lithium secondary battery is a hermetically-closed type, a function of retaining the electrolytic solution is required for the separator. As for a separator, it is preferable to use a thin-thickness and microporous or nonwoven-shaped film that is made from a material, such as polyethylene, polypropylene, polyacrylonitrile, aramide, polyimide, cellulose, glass and the like.

A configuration of the lithium secondary battery is not limited particularly, and can be formed as a variety of configurations, such as cylindrical types, laminated types, coin types, button types and the like. Preferable embodiments of the present invention are as follows.

[1] A positive-electrode active material comprising a carbon-sulfur structure which has Raman shift peaks at around 500 $cm^{-1}$, at around 1,250 $cm^{-1}$ and at around 1,450 $cm^{-1}$ in a Raman spectrum.

[2] The positive-electrode active material of [1], wherein the carbon-sulfur structure also has a Raman shift peak at around 1,940 $cm^{-1}$ in the Raman spectrum.

[3] The positive-electrode active material of [1] or [2], wherein the carbon-sulfur structure is a compound represented by the formula (i).

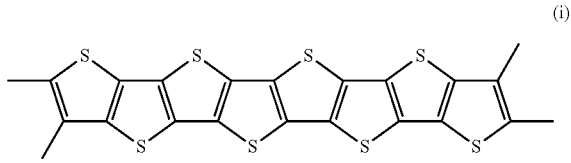

(i)

[4] The positive-electrode active material of any of [1] to [3], wherein elemental sulfur is enclosed in the carbon-sulfur structure.

[5] The positive-electrode active material of any of [1] to [4] comprising an electrically-conductive powder.

[6] The positive-electrode active material of [5], wherein the electrically-conductive powder is a carbon material having a graphite structure.

[7] The positive-electrode active material of any of [1] to [6], wherein a total content of the sulfur is not less than 50% by mass.

[8] The positive-electrode active material of any of [1] to [7], wherein a content of hydrogen is not more than 1.6% by mass, preferably not more than 1.0% by mass.

[9] The sulfur-based positive-electrode active material of any of [1] to [8], wherein peaks exist at around 917 $cm^{-1}$, at around 1,042 $cm^{-1}$, at around 1,149 $cm^{-1}$, at around 1,214 $cm^{-1}$, at around 1,388 $cm^{-1}$, at around 1,415 $cm^{-1}$ and at around 1,439 $cm^{-1}$ in an FT-IR spectrum.

[10] The sulfur-based positive-electrode active material of any of [1] to [9] obtained by
compounding in an unvulcanized diene rubber:
sulfur and at least one of
(1) 1 to 60 parts by mass, preferably 10 to 30 parts by mass of a vulcanization accelerator based on 100 parts by mass of the diene rubber and
(2) 2 to 60 parts by mass, preferably 10 to 40 parts by mass of an electrically-conductive powder based on 100 parts by mass of the diene rubber, and
heat-treating a mixture.

[11] A sulfur-based positive-electrode active material characterized by being obtained by compounding in an unvulcanized diene rubber:
sulfur and at least one of
(1) 1 to 60 parts by mass, preferably 10 to 30 parts by mass of a vulcanization accelerator based on 100 parts by mass of the diene rubber and
(2) 2 to 60 parts by mass, preferably 10 to 40 parts by mass of an electrically-conductive powder based on 100 parts by mass of the diene rubber, and
heat-treating a mixture.

[12] The sulfur-based positive-electrode active material of [11], wherein the vulcanization accelerator is a dithiocarbamate compound.

[13] The sulfur-based positive-electrode active material of [11] or [12], wherein a compounding ratio of the sulfur is 250 to 2,000 parts by mass, preferably 500 to 2,000 parts by mass, more preferably 800 to 1,500 parts by mass based on 100 parts by mass of the diene rubber.

[14] The sulfur-based positive-electrode active material of any of [11] to [13] prepared by a heat treatment under a non-oxidizing atmosphere.

[15] A lithium-ion secondary battery characterized by comprising the sulfur-based positive-electrode active material of any of [1] to [14].

EXAMPLE

Example 1

Production of Sulfur-based Positive-electrode Active Material (Preparation of Rubber Composition)
A high-cis butadiene rubber [UBEPOL (registered trademark) BR150L manufactured by Ube Industries, Ltd., Cis 1,4 bond content: 98% by mass, diene rubber I] was used as a diene rubber, colloidal sulfur manufactured by TSURUMI CHEMICAL INDUSTRY CO., LTD. was used as sulfur and zinc diethyldithiocarbamate [Nocceler (registered trademark) EZ manufactured by OUCHI SHINKO CHEMICAL INDUSTRIAL CO., LTD.] was used as a vulcanization accelerator.

To 100 parts by mass of the above high-cis butadiene rubber were compounded 1,000 parts by mass of the colloidal sulfur and 25 parts by mass of the vulcanization accelerator and the compounded mixture was kneaded using a kneading testing device [MIX-LABO manufactured by Moriyama Company, Ltd.] to prepare a rubber composition.

(Reaction Apparatus)

Figure 1:
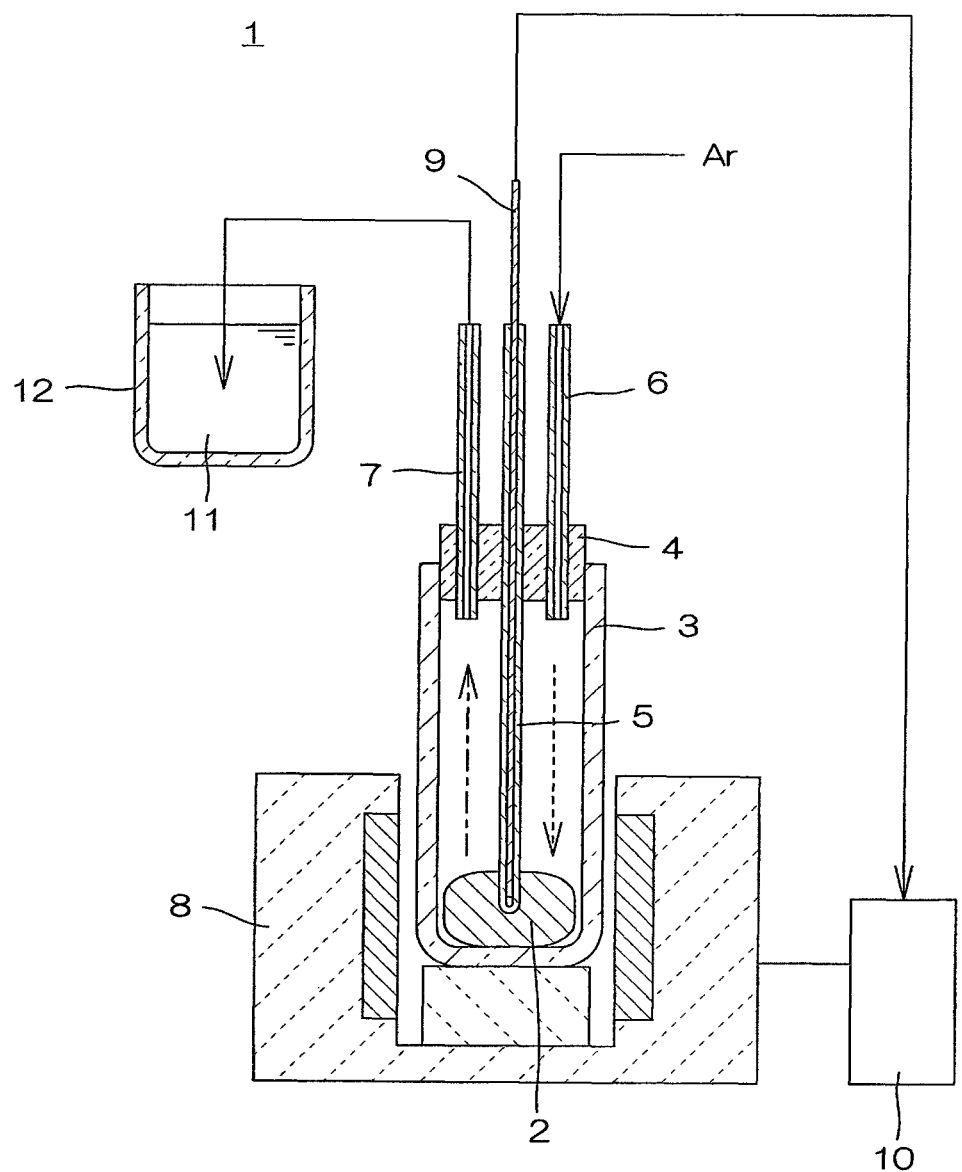
FIG. 1 is a sectional view schematically illustrating a reaction apparatus used for a production of a sulfur-based positive-electrode active material in Examples of the present invention.

A reaction apparatus 1 as illustrated in FIG. 1 was used for a heat treatment of the rubber composition. The reaction apparatus 1 comprises a reaction container 3, which has an inner diameter of 50 mm and a height of 300 mm and made of quartz glass, that is formed as a bottomed cylindrical shape to contain and heat-treat the rubber composition 2; a silicone plug 4 for closing an upper opening of the reaction container 3; an alumina tube 5 and two glass tubes 6, 7 for penetrating the plug 4; and an electric furnace 8 for heating the reaction container 3 from the bottom side.

The alumina tube 5 is formed in such a length that the lower part thereof reaches the rubber composition 2 contained in the bottom of the reaction container 3 from the plug 4 and a thermocouple 9 is inserted through the inside of the alumina tube 5. The alumina tube 5 is used as a protective tube for the thermocouple 9. The leading end of the thermocouple 9 is inserted into the rubber composition 2 while being protected by the closed leading end of the alumina tube 5 and functions to measure a temperature of the rubber composition 2. The output of the thermocouple 9 is input in a temperature controller 10 of the electric furnace 8 as shown by the solid arrow in the drawing and the temperature controller 10 functions to control a heating temperature of the electric furnace 8 based on the input from the thermocouple 9.

The glass tubes 6, 7 are formed such that the bottom end thereof projects in 3 mm downwardly from the plug 4. Also, the upper part of the reaction container 3 projects from the electric furnace 8 to be exposed to atmosphere. Therefore, steam of sulfur generating from the rubber composition due to heating of the reaction container 3 is raised to the upper part of the reaction container 3 as shown by the long dashed short dashed line arrow in the drawing, and transformed to a liquid drop while being cooled to be dropped and refluxed as shown by the broken line arrow in the drawing. Consequently, sulfur in the reaction system does not leak to the outside through the glass tube 7.

The glass tube 6 is continuously supplied with Ar gas from a gas supply system which is not shown. The glass tube 7 is connected to a trapping bath 12 containing a sodium hydroxide aqueous solution 11. The exhaust gas moving toward the outside through the glass tube 7 from the reaction container 3 is released to the outside after passing through the sodium hydroxide aqueous solution 11 in the trapping bath 12. Therefore, even if hydrogen sulfide gas generated from a vulcanization reaction is included in the exhaust gas, the hydrogen sulfide gas is removed therefrom by being neutralized with the sodium hydroxide aqueous solution.

(Heat Treatment)

In a heat treatment process, a heating with the electric furnace 8 was started 30 minutes after starting a continuous supply of Ar gas to the reaction container 3 holding the rubber composition 2 in its bottom at a flow rate of 80 ml/min from the gas supply system. The temperature elevation rate was 5° C./min. Since a generation of gas was started when the temperature of the rubber composition became 200° C., the heating was continued while adjusting the flow rate of the Ar gas such that the flow rate of the exhaust gas became as constant as possible.

When the temperature of the rubber composition 2 reached 450° C., a heat treatment was conducted for two hours while maintaining the temperature of 450° C. Then, the rubber composition 2 was cooled naturally under an Ar gas atmosphere to 25° C. while adjusting the flow rate of the Ar gas and a reaction product (originated from the rubber composition) was taken out of the reaction container 3.
(Removal of Unreacted Sulfur)

The reaction product was pulverized in a mortar and 2 g of a pulverized product was put in a glass tube oven and heated for three hours at 200° C. while vacuum suction was conducted to produce a sulfur-based positive-electrode active material in which unreacted sulfur was removed. The temperature elevation rate was 10° C./min.
<Preparation of Lithium-ion Secondary Battery>
(Positive Electrode)

To 3 mg of the sulfur-based positive-electrode active material as produced above were added 2.7 mg of acetylene black as an electrically-conductive additive, 0.3 g of polytetrafluoroethylene as a binder and an appropriate amount of hexane, and the mixture was kneaded in an agate mortar till the mixture turned into a film shape. Then the entire amount of the kneaded product in a film shape in the mortar was put on an aluminum mesh as a collector with #100 in mesh roughness that had been punched out to a circle with 14 mm in diameter, and after being press-fitted with a table pressing machine, the film was dried for three hours at 100° C. to form a positive electrode.
(Negative Electrode)

A metallic lithium foil [manufactured by Honjo Metal Co., Ltd.] having a thickness pf 0.5 mm had been punched out to a circle with 14 mm in diameter and was prepared as a negative electrode.
(Electrolyte)

A nonaqueous electrolyte in which $LiPF_6$ had been dissolved in a mixture solvent of ethylene carbonate and diethyl carbonate was used as an electrolyte. A volume ratio of ethylene carbonate and diethyl carbonate was 1:1. A concentration of $LiPF_6$ was 1.0 mol/liter.
(Lithium-ion Secondary Battery)

Using the above positive electrode, the negative electrode and the electrolyte, a coin-type lithium-ion secondary battery was prepared in a dry room. Specifically, a separator [Celgard (registered trademark) 2400 manufactured by Celgard] consisted of a polypropylene microporous film with 25 μm in thickness and a glass nonwoven filter with 500 μm in thickness were sandwiched between the positive electrode and the negative electrode to form an electrode-assembly battery.

Then, the formed electrode-assembly battery was accommodated in a battery case (e.g., a member for CR2032-type coin battery, a product of HOSEN Co., Ltd.) made of a stainless-steel container and the electrolyte solution was added thereto. After that, the battery case was sealed hermetically with a crimping machine, thereby obtaining a coin-type lithium-ion secondary battery.

Example 2

A rubber composition, a sulfur-based positive-electrode active material and a coin-type lithium-ion secondary battery were prepared in the same manner as that of Example 1 except that 25 parts by mass of zinc isopropylxanthate [Nocceler ZIX-O manufactured by OUCHI SHINKO CHEMICAL INDUSTRIAL CO., LTD.] was used as a vulcanization accelerator in the production of the rubber composition.

Example 3

A rubber composition, a sulfur-based positive-electrode active material and a coin-type lithium-ion secondary battery were prepared in the same manner as that of Example 1 except that 25 parts by mass of N,N'-diethylthiourea [Nocceler EUR manufactured by OUCHI SHINKO CHEMICAL INDUSTRIAL CO., LTD.] was used as a vulcanization accelerator in the production of the rubber composition.

Example 4

A rubber composition, a sulfur-based positive-electrode active material and a coin-type lithium-ion secondary battery were prepared in the same manner as that of Example 1 except that 25 parts by mass of tetramethylthiuram monosulfide [Nocceler TS manufactured by OUCHI SHINKO CHEMICAL INDUSTRIAL CO., LTD.] was used as a vulcanization accelerator in the production of the rubber composition.

Example 5

A rubber composition, a sulfur-based positive-electrode active material and a coin-type lithium-ion secondary battery were prepared in the same manner as that of Example 1 except that 25 parts by mass of dipentamethylenethiuram tetrasulfide [Nocceler TRA manufactured by OUCHI SHINKO CHEMICAL INDUSTRIAL CO., LTD.] was used as a vulcanization accelerator in the production of the rubber composition.

Example 6

A rubber composition, a sulfur-based positive-electrode active material and a coin-type lithium-ion secondary battery were prepared in the same manner as that of Example 1 except that 25 parts by mass of zinc N-ethyl-N-phenyldithiocarbamate [Nocceler PX manufactured by OUCHI SHINKO CHEMICAL INDUSTRIAL CO., LTD.] was used as a vulcanization accelerator in the production of the rubber composition.

Comparative Example 1

A rubber composition, a sulfur-based positive-electrode active material and a coin-type lithium-ion secondary battery were prepared in the same manner as that of Example 1 except that a vulcanization accelerator was not compounded in the production of the rubber composition.
<<Measurement of Charging and Discharging Capacity and Capacity Retention Rate>>

With respect to each coin-type lithium-ion secondary battery prepared in Examples and Comparative Example, charging and discharging were carried out at an electric-current value equivalent to 33.3 mA per 1 g of the positive-electrode active material under a condition of a test temperature of 30° C.

The discharge termination voltage was 1.0 V and the charging termination voltage was 3.0 V. Charging and discharging was repeated for 25 times, each discharging capacity (mAh/g) was measured and a discharging capacity (mAh/g) at the second discharging was regarded as an initial capacity. The larger the initial capacity is, the larger the charging and discharging capacity of the lithium-ion secondary battery is and which is evaluated as preferable. Moreover, from a charging and discharging capacity DC10 (mAh/g) at the tenth discharging and a charging and discharging capacity DC20 (mAh/g) at the twentieth discharging, a capacity retention rate (%) was calculated by the formula (a).

$$\text{Capacity retention rate (\%)} = \frac{DC_{20}(\text{mAh}/g)}{DC_{10}(\text{mAh}/g)} \times 100 \quad (a)$$

As explained above, it can be said that the higher the capacity retention rate is, the more excellent cyclability of the lithium-ion secondary battery is. Examples and Comparative Example that have a capacity retention rate of not less than 75% are regarded as satisfactory and those having a capacity retention rate of less than 75% are regarded as defective.

Elemental Analysis

An elemental analysis of sulfur-based positive-electrode active materials produced in Examples and Comparative Example was carried out.

As for carbon, hydrogen and nitrogen, a mass ratio (%) based on a total amount of a sulfur-based positive-electrode active material was calculated from a mass amount measured with a full automatic elemental analysis device vario MICRO cube manufactured by Elementar Analysensysteme GmbH. As for sulfur, a mass ratio (%) based on a total amount of a sulfur-based positive-electrode active material was calculated as a total content of sulfur, from a mass amount measured with an ion chromatograph device DX-320 manufactured by Dionex Corporation using a column (IonPac AS12A) manufactured by the same Corporation.

The results of the above are shown in Tables 1 and 2.

TABLE 1

|  | Ex. 1 | Ex. 2 | Ex. 3 | Ex. 4 |
|---|---|---|---|---|
| Part by mass |  |  |  |  |
| Diene rubber I | 100 | 100 | 100 | 100 |
| Sulfur Vulcanization accelerator | 1,000 | 1,000 | 1,000 | 1,000 |
| EZ | 25 | — | — | — |
| ZIX-O | — | 25 | — | — |
| EUR | — | — | 25 | — |
| TS | — | — | — | 25 |
| TRA | — | — | — | — |
| PX | — | — | — | — |
| Evaluation Discharging capacity (mAh/g) |  |  |  |  |
| First time | 1,052 | 809 | 439 | 1,086 |
| Second time | 687 | 418 | 172 | 709 |
| Tenth time | 492 | 342 | 151 | 508 |
| Twentieth time | 411 | 288 | 150 | 425 |
| Capacity retention rate (%) | 84 | 84 | 99 | 86 |
| Elemental analysis (%) |  |  |  |  |
| C | 35.43 | 38.30 | 41.97 | 40.78 |
| H | 0.23 | 0.26 | 0.16 | 0.11 |
| N | 0.04 | 0.11 | 0.17 | 0.08 |
| S | 57.29 | 58.58 | 57.53 | 59.13 |

TABLE 2

|  | Ex. 5 | Ex. 6 | Com. Ex. 1 |
|---|---|---|---|
| Part by mass |  |  |  |
| Diene rubber I | 100 | 100 | 100 |
| Sulfur Vulcanization accelerator | 1,000 | 1,000 | 1,000 |
| EZ | — | — | — |
| ZIX-O | — | — | — |
| EUR | — | — | — |
| TS | — | — | — |
| TRA | 25 | — | — |
| PX | — | 25 | — |
| Evaluation Discharging capacity (mAh/g) |  |  |  |
| First time | 533 | 1,021 | 626 |
| Second time | 248 | 673 | 320 |
| Tenth time | 199 | 471 | 242 |
| Twentieth time | 184 | 394 | 180 |
| Capacity retention rate (%) | 92 | 84 | 74 |
| Elemental analysis (%) |  |  |  |
| C | 40.15 | 37.28 | 43.30 |
| H | 0.05 | 0.24 | 0.36 |
| N | 0.28 | 0.10 | 0.01 |
| S | 59.03 | 58.07 | 54.30 |

From the results of Comparative Example 1 and Examples 1 to 6 shown in Tables 1 and 2, it is found that by further compounding a vulcanization accelerator in a diene rubber and sulfur, an incorporated amount of sulfur is increased and a total content of sulfur can be made as much as possible within the range of not less than 50% by mass and a content of hydrogen can be made as less as possible within the range of not more than 1.6% by mass, thereby a sulfur-based positive-electrode active material which can improve a capacity retention rate of a lithium-ion secondary battery, that is, cyclability, compared to that of Comparative Example 1, can be obtained.

From the results of Examples 1 to 6, it is also found that in order to further improve cyclability of a lithium-ion secondary battery and also improve a charging and discharging capacity, it is preferable to selectively use a dithiocarbamate compound, particularly a zinc salt thereof or a thiuram compound as a vulcanization accelerator.

<<Raman Spectrum Analysis>>

With respect to a sulfur-based positive-electrode active material produced in Example 1, a Raman spectrum analysis was carried out using a laser Raman microscope RAMAN-11 manufactured by Nanophoton Corporation under a condition of an excitation wavelength $\lambda=532$ nm, a grating: 600 gr/mm, a resolution: 2 cm$^{-1}$.

The result is shown in FIG. 2. FIG. 2 shows a relative strength in a vertical axis and a Raman shift (cm$^{-1}$) in a horizontal axis. From FIG. 2, it is confirmed that the sulfur-based positive-electrode active material produced in Example 1 has peaks at around 500 cm$^{-1}$, at around 1,250 cm$^{-1}$, at around 1,450 cm$^{-1}$ and at around 1,940 cm$^{-1}$ in a Raman shift, and this result reasonably corresponds to the above result of an elemental analysis that a large amount of sulfur is incorporated and hydrogen is reduced.

Moreover, a spectrum in FIG. 2 is, as explained above, different from a spectrum referred to as D band and G band which are respectively seen at around 1,350 cm$^{-1}$ and at around 1,590 cm$^{-1}$ in a graphite structure that is six-membered rings, but is similar to a spectrum of thienoacene as described in a document (Chem. Phys. Chem 2009, 10, 3069-3076) and thus the carbon-sulfur structure, a main component of the sulfur-based positive-electrode active material produced in Example 1, is assumed to have a thienoacene structure as represented by the above formula (i).

Additionally, it is confirmed that the similar results are also shown in other Examples while they are not shown. However, it should be noted that since the later described Example 22 in which a natural rubber was used as a diene rubber does not have a peak at around 1,940 cm$^{-1}$ but has peaks at around 1,400 cm$^{-1}$ and 1,550 cm$^{-1}$, it is assumed that Example 22 is basically composed of a thienoacene structure but includes a graphite structure in part.

FT-IR Spectrum Analysis

With respect to the sulfur-based positive electrode active material produced in Example 1, an FT-IR spectrum analysis was carried out using a Fourier transformation infrared spectrophotometer IRAffinity-1 manufactured by SHIMADZU CORPORATION under a condition of a resolution: 4 cm$^{-1}$, a number of integration: 100, a measurement range: 400 cm$^{-1}$ to 4,000 cm$^{-1}$. The result is shown in FIG. 4.

Figure 4:
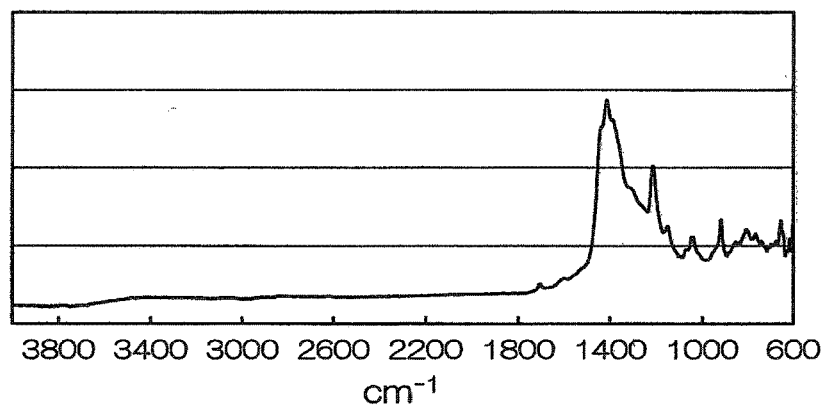
FIG. 4 is a graph showing a result of an FT-IR spectrum analysis of the sulfur-based positive-electrode active material of Example 1.

From FIG. 4, it is confirmed that the sulfur-based positive-electrode active material produced in Example 1 has peaks at around 917 cm$^{-1}$, at around 1,042 cm$^{-1}$, at around 1,149 cm$^{-1}$, at around 1,214 cm$^{-1}$, at around 1,388 cm$^{-1}$, at around 1,415 cm$^{-1}$ and at around 1,439 cm$^{-1}$ in an FT-IR spectrum, and this result reasonably corresponds to the above result of an elemental analysis that a large amount of sulfur is incorporated and hydrogen is reduced.

Additionally, it is confirmed that the similar results are also shown in other Examples while they are not shown.

Examples 7 to 10 and Comparative Example 2

Rubber compositions, sulfur-based positive-electrode active materials and coin-type lithium-ion secondary batteries were prepared in the same manner as that of Example 1 except that the amount of Nocceler EZ as a vulcanization accelerator is 1 part by mass (Example 7), 10 parts by mass (Example 8), 50 parts by mass (Example 9), 60 parts by mass (Example 10) and 100 parts by mass (Comparative Example 2) based on 100 parts by mass of a diene rubber.

Each of the above tests were performed with respect to each of the above Examples and Comparative Example to evaluate characteristics thereof. The results are shown in Tables 3 and 4 with the results of Example 1 and Comparative Example 1.

TABLE 3

|  | Com. Ex. 1 | Ex. 7 | Ex. 8 | Ex. 1 |
|---|---|---|---|---|
| Part by mass |  |  |  |  |
| Diene rubber I | 100 | 100 | 100 | 100 |
| Sulfur Vulcanization accelerator | 1,000 | 1,000 | 1,000 | 1,000 |
| EZ | — | 1 | 10 | 25 |
| Evaluation Discharging capacity (mAh/g) |  |  |  |  |
| First time | 626 | 841 | 997 | 1,052 |
| Second time | 320 | 549 | 652 | 687 |
| Tenth time | 242 | 393 | 461 | 492 |
| Twentieth time | 180 | 329 | 386 | 411 |
| Capacity retention rate (%) | 74 | 84 | 84 | 84 |

TABLE 3-continued

|  | Com. Ex. 1 | Ex. 7 | Ex. 8 | Ex. 1 |
|---|---|---|---|---|
| Elemental analysis (%) |  |  |  |  |
| C | 43.30 | 42.87 | 39.60 | 35.43 |
| H | 0.36 | 0.36 | 0.33 | 0.23 |
| N | 0.01 | 0.01 | 0.04 | 0.04 |
| S | 54.30 | 53.76 | 54.91 | 57.29 |

TABLE 4

|  | Ex. 9 | Ex. 10 | Com. Ex. 2 |
|---|---|---|---|
| Part by mass |  |  |  |
| Diene rubber I | 100 | 100 | 100 |
| Sulfur Vulcanization accelerator | 1,000 | 1,000 | 1,000 |
| EZ | 50 | 60 | 100 |
| Evaluation Discharging capacity (mAh/g) |  |  |  |
| First time | 897 | 865 | 832 |
| Second time | 568 | 504 | 462 |
| Tenth time | 419 | 393 | 387 |
| Twentieth time | 342 | 305 | 287 |
| Capacity retention rate (%) | 82 | 78 | 74 |
| Elemental analysis (%) |  |  |  |
| C | 35.22 | 34.88 | 30.62 |
| H | 0.31 | 0.37 | 0.37 |
| N | 0.04 | 0.05 | 0.03 |
| S | 53.11 | 51.89 | 49.52 |

From the results of Examples 1 and 7 to 10 and Comparative Examples 1 and 2 shown in Tables 3 and 4, it is found that a compounding ratio of a vulcanization accelerator needs to be 1 to 60 parts by mass for improving a capacity retention rate of a lithium-ion secondary battery, that is, cyclability, and in view of further improvement of such effect and also improvement of a charging and discharging capacity of a lithium-ion secondary battery, the compounding ratio is preferably not less than 10 parts by mass and preferably not more than 30 parts by mass within the above range.

Example 11

A rubber composition, a sulfur-based positive-electrode active material and a coin-type lithium-ion secondary battery were prepared in the same manner as that of Example 1 except that the amount of sulfur is 250 parts by mass based on 100 parts by mass of the diene rubber and the amount of Nocceler EZ as a vulcanization accelerator is 6.25 parts by mass based on 100 parts by mass of the diene rubber.

Example 12

A rubber composition, a sulfur-based positive-electrode active material and a coin-type lithium-ion secondary battery were prepared in the same manner as that of Example 1 except that the amount of sulfur is 500 parts by mass based on 100 parts by mass of the diene rubber and the amount of Nocceler EZ as a vulcanization accelerator is 12.5 parts by mass based on 100 parts by mass of the diene rubber.

Each of the above tests were performed with respect to the both Examples to evaluate characteristics thereof. The results are shown in Table 5 with the results of Example 1.

TABLE 5

|  | Ex. 11 | Ex. 12 | Ex. 1 |
|---|---|---|---|
| Part by mass | | | |
| Diene rubber I | 100 | 100 | 100 |
| Sulfur Vulcanization accelerator | 250 | 500 | 1,000 |
| EZ | 6.25 | 12.5 | 25 |
| Evaluation Discharging capacity (mAh/g) | | | |
| First time | 16 | 623 | 1,052 |
| Second time | 7 | 345 | 687 |
| Tenth time | 5 | 267 | 492 |
| Twentieth time | 5 | 212 | 411 |
| Capacity retention rate (%) | 100 | 79 | 84 |
| Elemental analysis (%) | | | |
| C | 52.55 | 42.08 | 35.43 |
| H | 1.62 | 0.46 | 0.23 |
| N | 0.03 | 0.03 | 0.04 |
| S | 43.66 | 54.09 | 57.29 |

From the results of Examples 1, 11 and 12 shown in Table 5, it is found that a compounding ratio of sulfur is preferably not less than 250 parts by mass for improving a charging and discharging capacity or cyclability of a lithium-ion secondary battery.

Examples 13 to 18

Rubber compositions, sulfur-based positive-electrode active materials and coin-type lithium-ion secondary batteries were prepared in the same manner as that of Example 1 except that carbon black [acetylene black, Denka black (registered trademark) manufactured by DENKI KAGAKU KOGYO KABUSHIKI KAISHA, carbon black i] as an electrically-conductive powder was compounded in an amount of 2 parts by mass (Example 13), 10 parts by mass (Example 14), 20 parts by mass (Example 15), 30 parts by mass (Example 16), 40 parts by mass (Example 17) and 60 parts by mass (Example 18) based on 100 parts by mass of a diene rubber.

Each of the above tests were performed with respect to each of the above Examples to evaluate characteristics thereof. The results are shown in Tables 6 and 7 together with the results of Example 1.

TABLE 6

|  | Ex. 1 | Ex. 13 | Ex. 14 | Ex. 15 |
|---|---|---|---|---|
| Part by mass | | | | |
| Diene rubber I | 100 | 100 | 100 | 100 |
| Sulfur Vulcanization accelerator | 1,000 | 1,000 | 1,000 | 1,000 |
| EZ | 25 | 25 | 25 | 25 |
| Carbon black i | — | 2 | 10 | 20 |
| Evaluation Discharging capacity (mAh/g) | | | | |
| First time | 1,052 | 1,046 | 985 | 919 |
| Second time | 687 | 686 | 640 | 594 |
| Tenth time | 492 | 482 | 475 | 457 |
| Twentieth time | 411 | 414 | 407 | 402 |
| Capacity retention rate (%) | 84 | 86 | 86 | 88 |

TABLE 6-continued

|  | Ex. 1 | Ex. 13 | Ex. 14 | Ex. 15 |
|---|---|---|---|---|
| Elemental analysis (%) | | | | |
| C | 35.43 | 36.28 | 39.68 | 43.92 |
| H | 0.23 | 0.23 | 0.24 | 0.24 |
| N | 0.04 | 0.04 | 0.05 | 0.06 |
| S | 57.29 | 56.78 | 54.76 | 52.22 |

TABLE 7

|  | Ex. 16 | Ex. 17 | Ex. 18 |
|---|---|---|---|
| Part by mass | | | |
| Diene rubber I | 100 | 100 | 100 |
| Sulfur Vulcanization accelerator | 1,000 | 1,000 | 1,000 |
| EZ | 25 | 25 | 25 |
| Carbon black i | 30 | 40 | 60 |
| Evaluation Discharging capacity (mAh/g) | | | |
| First time | 773 | 707 | 657 |
| Second time | 437 | 389 | 338 |
| Tenth time | 312 | 275 | 226 |
| Twentieth time | 287 | 256 | 207 |
| Capacity retention rate (%) | 92 | 93 | 92 |
| Elemental analysis (%) | | | |
| C | 48.27 | 49.96 | 53.86 |
| H | 0.30 | 0.34 | 0.36 |
| N | 0.05 | 0.05 | 0.04 |
| S | 47.85 | 45.67 | 41.60 |

From the results of Examples 1, 13 to 18 shown in Tables 6 and 7, it is found that cyclability of a lithium-ion secondary battery can be further improved while preventing a decrease of a charging and discharging capacity by using carbon black together as a vulcanization accelerator, and for that purpose, a compounding ratio of carbon black is preferably not less than 2 parts by mass, particularly preferably not less than 20 parts by mass and preferably not more than 60 parts by mass, particularly preferably not more than 40 parts by mass.

Example 19

A rubber composition, a sulfur-based positive-electrode active material and a coin-type lithium-ion secondary battery were prepared in the same manner as that of Example 1 except that carbon black [DIABLACK (registered trademark) I manufactured by Mitsubishi Chemical Corporation, carbon black ii] as an electrically-conductive powder that was different from the carbon black used in Examples 13 to 18 was compounded in an amount of 20 parts by mass based on 100 parts by mass of the diene rubber.

Example 20

A rubber composition, a sulfur-based positive-electrode active material and a coin-type lithium-ion secondary battery were prepared in the same manner as that of Example 1 except that carbon black [DIABLACK E manufactured by Mitsubishi Chemical Corporation, carbon black iii] as an electrically-conductive powder that was different from the carbon black used in Examples 13 to 18 was compounded in an amount of 20 parts by mass based on 100 parts by mass of the diene rubber.

Example 21

A rubber composition, a sulfur-based positive-electrode active material and a coin-type lithium-ion secondary battery were prepared in the same manner as that of Example 1 except that 18 parts by mass of the carbon black i which is the same as the one used in Examples 13 to 18 and 2 parts by mass of CNT (NC7000 manufactured by Nanocyl) as an electrically-conductive powder were compounded based on 100 parts by mass of the diene rubber.

Each of the above tests were performed with respect to each of the above Examples to evaluate characteristics thereof. The results are shown in Table 8 together with the results of Example 15.

TABLE 8

|  | Ex. 15 | Ex. 19 | Ex. 20 | Ex. 21 |
|---|---|---|---|---|
| Part by mass |  |  |  |  |
| Diene rubber I | 100 | 100 | 100 | 100 |
| Sulfur Vulcanization accelerator | 1,000 | 1,000 | 1,000 | 1,000 |
| EZ | 25 | 25 | 25 | 25 |
| Carbon black i | 20 | — | — | 18 |
| Carbon black ii | — | 20 | — | — |
| Carbon black iii | — | — | 20 | — |
| CNT | — | — | — | 2 |
| Evaluation Discharging capacity (mAh/g) |  |  |  |  |
| First time | 919 | 911 | 972 | 903 |
| Second time | 594 | 596 | 641 | 588 |
| Tenth time | 457 | 449 | 506 | 469 |
| Twentieth time | 402 | 395 | 445 | 430 |
| Capacity retention rate (%) | 88 | 88 | 88 | 92 |
| Elemental analysis (%) |  |  |  |  |
| C | 43.92 | 43.88 | 44.23 | 44.00 |
| H | 0.24 | 0.24 | 0.23 | 0.26 |
| N | 0.06 | 0.06 | 0.06 | 0.05 |
| S | 52.22 | 52.34 | 51.03 | 55.22 |

From the results of Examples 15 and 19 to 21 shown in Table 8, it is found that various carbon black can be used as an electrically-conductive powder and cyclability of a lithium-ion secondary battery can be further improved without largely increasing a cost if a small amount of CNT is used together with carbon black.

Example 22

A rubber composition, a sulfur-based positive-electrode active material and a coin-type lithium-ion secondary battery were prepared in the same manner as that of Example 15 except that 100 parts by mass of a natural rubber (TSR20, diene rubber II) was compounded as a diene rubber.

Each of the above tests were performed with respect to the above Example 22 to evaluate characteristics thereof. The results are shown in Table 9 together with the results of Example 15.

TABLE 9

|  | Ex. 15 | Ex. 22 |
|---|---|---|
| Part by mass |  |  |
| Diene rubber I | 100 | — |
| Diene rubber II | — | 100 |
| Sulfur Vulcanization accelerator | 1,000 | 1,000 |
| EZ | 25 | 25 |
| Carbon black i | 20 | 20 |
| Evaluation Discharging capacity (mAh/g) |  |  |
| First time | 919 | 965 |
| Second time | 594 | 600 |
| Tenth time | 457 | 453 |
| Twentieth time | 402 | 390 |
| Capacity retention rate (%) | 88 | 86 |
| Elemental analysis (%) |  |  |
| C | 43.92 | 42.88 |
| H | 0.24 | 0.18 |
| N | 0.06 | 0.21 |
| S | 52.22 | 53.01 |

Figure 3:
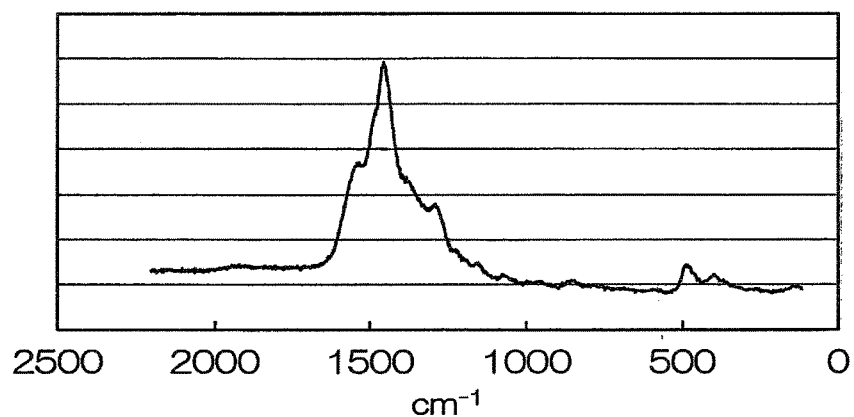
FIG. 3 is a graph showing a result of a Raman spectrum analysis of the sulfur-based positive-electrode active material of Example 22.

From the results of Examples 15 and 22 shown in Table 9, it is found that a natural rubber and a high-cis polybutadiene rubber are preferable as a diene rubber and in view of a capacity retention rate, Example 15 in which a high-cis polybutadiene rubber is used is more preferable than Example 22 in which a natural rubber is used. It seems to because, as obvious from the results shown in FIGS. 2 and 3 as explained above, a carbon-sulfur structure using a high-cis polybutadiene rubber as a diene rubber has more homogenous than a carbon-sulfur structure using a natural rubber as a diene rubber.

Examples 23 to 28

Rubber compositions, sulfur-based positive-electrode active materials and coin-type lithium-ion secondary batteries were prepared in the same manner as that of Example 1 except that carbon black [acetylene black, Denka black (registered trademark) manufactured by DENKI KAGAKU KOGYO KABUSHIKI KAISHA, carbon black i] as an electrically-conductive powder was compounded in an amount of 2 parts by mass (Example 23), 10 parts by mass (Example 24), 20 parts by mass (Example 25), 30 parts by mass (Example 26), 40 parts by mass (Example 27) and 60 parts by mass (Example 28) based on 100 parts by mass of a diene rubber, instead of zinc diethyldithiocarbamate as a vulcanization accelerator.

Each of the above tests were performed with respect to each of the above Examples to evaluate characteristics thereof. The results are shown in Tables 10 and 11 together with the results of Comparative Example 1.

TABLE 10

|  | Com. Ex. 1 | Ex. 23 | Ex. 24 | Ex. 25 |
|---|---|---|---|---|
| Part by mass |  |  |  |  |
| Diene rubber I | 100 | 100 | 100 | 100 |
| Sulfur | 1,000 | 1,000 | 1,000 | 1,000 |
| Carbon black i | — | 2 | 10 | 20 |
| Evaluation Discharging capacity (mAh/g) |  |  |  |  |
| First time | 626 | 616 | 606 | 585 |
| Second time | 320 | 316 | 312 | 303 |
| Tenth time | 242 | 245 | 248 | 253 |

TABLE 10-continued

|  | Com. Ex. 1 | Ex. 23 | Ex. 24 | Ex. 25 |
|---|---|---|---|---|
| Twentieth time | 180 | 196 | 213 | 245 |
| Capacity retention rate (%) | 74 | 80 | 86 | 97 |
| Elemental analysis (%) |  |  |  |  |
| C |  | 43.30 | 45.15 | 46.99 | 50.68 |
| H |  | 0.36 | 0.40 | 0.44 | 0.51 |
| N |  | 0.01 | 0.02 | 0.03 | 0.04 |
| S |  | 54.30 | 52.59 | 50.88 | 47.45 |

TABLE 11

|  | Ex. 26 | Ex. 27 | Ex. 28 |
|---|---|---|---|
| Part by mass |  |  |  |
| Diene rubber I | 100 | 100 | 100 |
| Sulfur | 1,000 | 1,000 | 1,000 |
| Carbon black i | 30 | 40 | 60 |
| Evaluation Discharging capacity (mAh/g) |  |  |  |
| First time | 542 | 503 | 431 |
| Second time | 281 | 262 | 224 |
| Tenth time | 232 | 217 | 189 |
| Twentieth time | 225 | 210 | 186 |
| Capacity retention rate (%) | 97 | 97 | 98 |
| Elemental analysis (%) |  |  |  |
| C | 54.21 | 55.97 | 57.72 |
| H | 0.53 | 0.54 | 0.57 |
| N | 0.05 | 0.07 | 0.06 |
| S | 44.02 | 42.11 | 40.19 |

From the results of Comparative Example 1 and Examples 23 to 28 shown in Tables 10 and 11, it is found that electrical conductivity of sulfur-based positive-electrode active materials is improved by further compounding an electrically-conductive powder to a diene rubber and sulfur, and reactivity with a lithium ion is increased, and a sulfur-based positive-electrode active material which has improved cyclability of a lithium-ion secondary battery compared to that of Comparative Example 1 can be obtained. Moreover, from the results of Examples 23 to 28, it is found that in order to improve cyclability of a lithium-ion secondary battery by successfully expressing the above effect obtained by compounding an electrically-conductive powder while preventing a decrease of a charging and discharging capacity of a lithium-ion secondary battery, the compounding ratio of the electrically-conductive powder needs to be 2 to 60 parts by mass based on 100 parts by mass of a diene rubber and within this range, is preferably not less than 5 parts by mass and preferably not more than 30 parts by mass.

EXPLANATION OF SYMBOLS

1 Reaction apparatus
2 Rubber composition
3 Reaction container
4 Lid
5 Alumina tube
6, 7 Glass tube
8 Electric furnace
9 Thermocouple
10 Temperature controller
11 Sodium hydroxide aqueous solution
12 Trapping bath

The invention claimed is:

1. A sulfur-based positive-electrode active material obtained by compounding in an unvulcanized diene rubber:
   250 to 2000 parts by mass of sulfur based on 100 parts by mass of the unvulcanized diene rubber and
   at least one of
   (1) 1 to 60 parts by mass of a vulcanization accelerator based on 100 parts by mass of the unvulcanized diene rubber and
   (2) 2 to 60 parts by mass of an electrically-conductive powder based on 100 parts by mass of the unvulcanized diene rubber,
   so as to form a compounded mixture, and
   heat-treating the compounded mixture, under a non-oxidizing atmosphere at a temperature of 300° C. to 550° C. so as to form the positive-electrode active material,
   wherein the positive-electrode active material has a carbon-sulfur structure which has Raman shift peaks at around 500 cm$^{-1}$, at around 1,250 cm$^{-1}$ and at around 1,450 cm$^{-1}$ in a Raman spectrum.

2. The sulfur-based positive-electrode active material of claim 1, wherein the carbon-sulfur structure also has a Raman shift peak at around 1,940 cm$^{-1}$ in the Raman spectrum.

3. The sulfur-based positive-electrode active material of claim 1, wherein the carbon-sulfur structure is a compound represented by the formula (i)

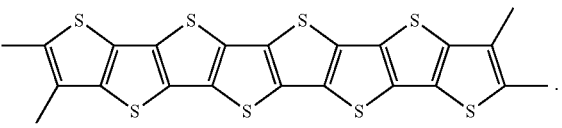

(i)

4. The sulfur-based positive-electrode active material of claim 1, wherein elemental sulfur is enclosed in the carbon-sulfur structure.

5. The sulfur-based positive-electrode active material of claim 1, comprising an electrically-conductive powder.

6. The sulfur-based positive-electrode active material of claim 5, wherein the electrically-conductive powder is a carbon material having a graphite structure.

7. The sulfur-based positive-electrode active material of claim 1, wherein a total content of the sulfur is not less than 50% by mass.

8. The sulfur-based positive-electrode active material of claim 1, wherein a content of hydrogen is not more than 1.6% by mass.

9. The sulfur-based positive-electrode active material of claim 1, wherein peaks exist at around 917 cm$^{-1}$, at around 1,042 cm$^{-1}$, at around 1,149 cm$^{-1}$, at around 1,214 cm$^{-1}$, at around 1,388 cm$^{-1}$, at around 1,415 cm$^{-1}$ and at around 1,439 cm$^{-1}$ in an FT-IR spectrum.

10. A sulfur-based positive-electrode active material being obtained by compounding in an unvulcanized diene rubber:
   250 to 2000 parts by mass of sulfur based on 100 parts by mass of the unvulcanized diene rubber and
   at least one of
   (1) 1 to 60 parts by mass of a vulcanization accelerator based on 100 parts by mass of the unvulcanized diene rubber and (2) 2 to 60 parts by mass of an electrically-conductive powder based on 100 parts by mass of the unvulcanized diene rubber, so as to form a compounded mixture, and heat-treating the compounded mixture under a non-oxidizing atmosphere at a temperature of 300° C. to 550° C. so as to form the positive-electrode active material.

11. The sulfur-based positive-electrode active material of claim 10, wherein the vulcanization accelerator is a dithiocarbamate compound.

12. The sulfur-based positive-electrode active material of claim 10, wherein a compounding ratio of the sulfur is 500 to 1500 parts by mass based on 100 parts by mass of a diene rubber.

13. A lithium-ion secondary battery wherein comprising the sulfur-based positive-electrode active material of claim 1.

14. A lithium-ion secondary battery wherein comprising the sulfur-based positive-electrode active material of claim 10.

15. The sulfur-based positive-electrode active material of claim 10, wherein the diene rubber is a high-cis butadiene rubber having Cis 1,4 bond content of 98% by mass.

\* \* \* \* \*